United States Patent [19]
Van Aken

[11] Patent Number: 5,396,586
[45] Date of Patent: Mar. 7, 1995

[54] APPARATUS AND METHOD FOR FILLING REGIONS BOUNDED BY CONIC CURVES

[75] Inventor: Jerry R. Van Aken, Sugar Land, Tex.

[73] Assignee: Texas Instruments Incorporated, Dallas, Tex.

[21] Appl. No.: 581,344

[22] Filed: Sep. 12, 1990

[51] Int. Cl.$^6$ .............................................. G06F 15/62
[52] U.S. Cl. .................... 395/141; 395/142; 395/150
[58] Field of Search ................ 395/134, 141, 150, 142

[56] References Cited

U.S. PATENT DOCUMENTS

4,648,045  3/1987  Demetrescu .................... 395/132 X

OTHER PUBLICATIONS

Jerry Van Aken and Mark Novak. ACM Transactions on Graphics, vol. 4, No. 2, Apr. 1985, pp. 147–169. Article entitled "Curve-Drawing Algorithms for Raster Displays."

Theo Paulidis, ACM Transactions on Graphics, vol. 2, #1, Jan. 1983, pp. 1–31. Article entitled "Curve Fitting with Conic Splives."

Jerry Van Aken. IEEE Computer Graphics and Applications, Sep. 1984, Article entitled "An Efficient Ellipse-Drawing Algorithm."

M. L. V. Pitteway. The Computer Journal, vol. 10, #3, Nov. 1967. Article entitled "Algorithm for Drawing Ellipses or Hyperbolae with a Digital Plotter."

Vaughn Pratt. Siggraph '85 Proceedings, vol. 19, #3. Article entitled "Techniques for Conic Splines."

*Primary Examiner*—Mark K. Zimmerman
*Attorney, Agent, or Firm*—Robert D. Marshall, Jr.; James C. Kesterson; Richard L. Donaldson

[57] ABSTRACT

An apparatus and method for filling regions bounded by piecewise-conic curves and more particularly to such an apparatus and method which is directed to curves defined by a conic equation. This simplifies the process of generating filled contours in applications, such as printing, which are based on font outlines while at the same time reducing computer time and generating more accurate results for each curve generation.

8 Claims, 2 Drawing Sheets

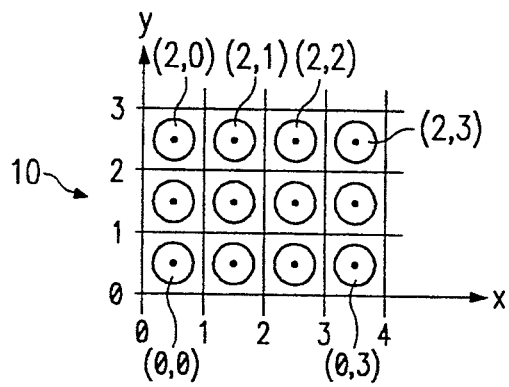
FIG. 1
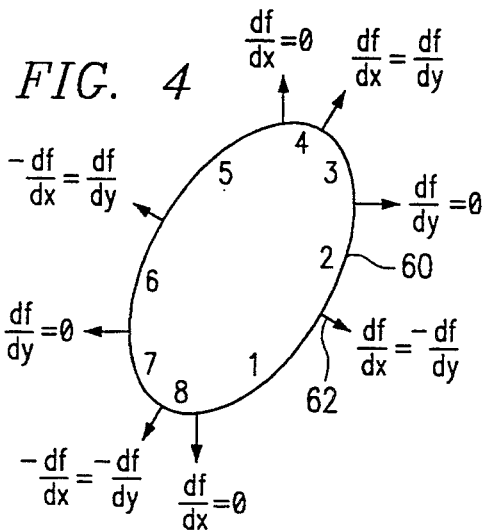
FIG. 4
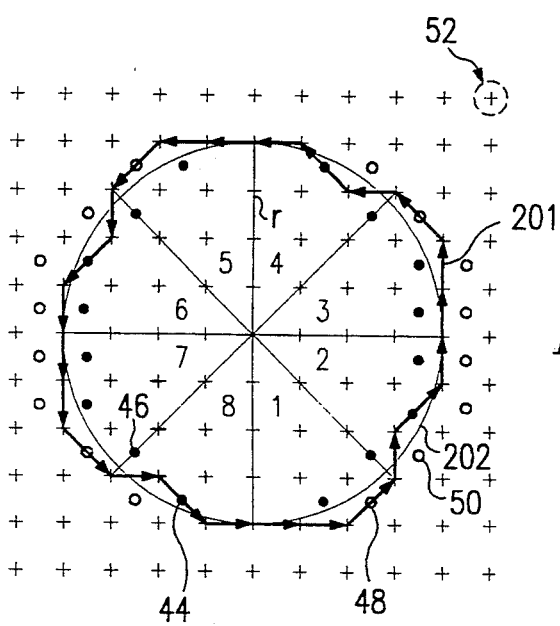
FIG. 2
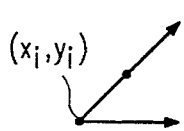 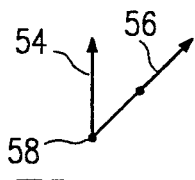  
FIG. 3A    FIG. 3B    FIG. 3C    FIG. 3D
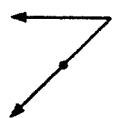 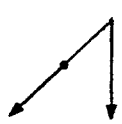 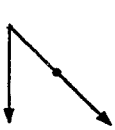 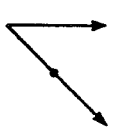
FIG. 3E    FIG. 3F    FIG. 3G    FIG. 3H

MIDPOINT RULE

FILL RULE

SYSTEM-LEVEL BLOCK DIAGRAM OF SOFTWARE IMPLEMENTATION OF INVENTION

SYSTEM-LEVEL BLOCK DIAGRAM OF HARDWARE IMPLEMENTATION OF INVENTION

APPARATUS AND METHOD FOR FILLING REGIONS BOUNDED BY CONIC CURVES

TECHNICAL FIELD OF THE INVENTION

This invention relates to an apparatus and method for filling regions bounded by piecewise-conic curves, and more particularly to such an apparatus and method which is directed to conic curves defined by a conic equation of the form:

$$f(x,y) = Ax^2 + Bxy + Cy^2 + Dx + Ey + F = 0$$

BACKGROUND OF THE INVENTION

Simplifying the process of generating filled contours is beneficial in applications such as printing which are based on font outlines. The traditional method is to use a parametric cubic spline algorithm to generate points along the curve. These points are saved, and used as the vertices of an approximating polygon that represents the bounded fill region to some specified degree of accuracy. The approximating polygon is then filled using a method such as the edge flag algorithm.

The polygon fill is performed in two steps: first, a list is made of the edges on each horizontal scan line of the raster; and second, for each scan line, a pair of edges defines a horizontal span of the filled region. Thus, in the traditional method, three steps are required, namely:

1. Generating vertices of approximating polygon by using a cubic spline (or DDA) algorithm;
2. Converting each straight edge of the generated polygon into a list of edges on a per-scan-line basis; and
3. Drawing each pair of edges on a scan line as a horizontal span belonging to the filled region using a parity or non-zero winding number fill algorithm.

In order to reduce computing time and to generate more accurate results, a system is required which reduces the number of steps required for each curve generation.

SUMMARY OF THE INVENTION

By using a conic curve tracker algorithm to directly generate the raster edges for each scan line intersected by a boundary curve, the number of steps required to generate the curve is reduced from three to two. The two required steps are:

1. Generating, by way of a conic curve tracker algorithm, the edge intersections at each scan line crossed by the curve; and
2. Drawing each pair of edges on a scan line as a horizontal span belonging to the filled region.

This approach requires less software code when executed on a processor and also requires fewer components and executes more rapidly when implemented in hardware.

The arithmetic is simplified because the system works in integer rather than floating-point mathematics. The inner loops require only simple operations such as addition, subtraction, and shifts and require no multiplies.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 depicts pixels arranged in an x-y coordinate system;

FIG. 2 shows curve tracking arrows indicating a curve tracking path along the circumference of a circle;

FIGS. 3A-3H are two step vectors for each octant of FIG. 2;

FIG. 4 depicts the eight gradient values at the octant boundaries of an ellipse;

DETAILED DESCRIPTION OF THE INVENTION

Figure 5A:
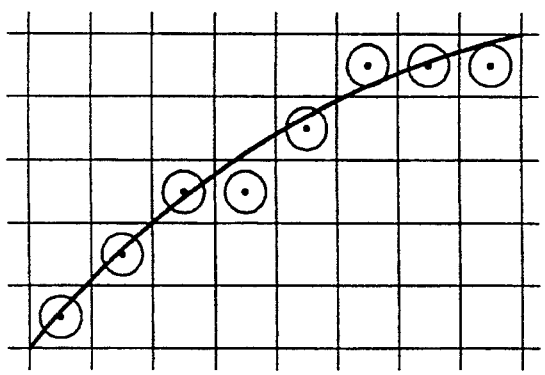
FIG. 5A and 5B show the difference between the existing midpoint rule and the fill rule of the instant invention.
Figure 5B:
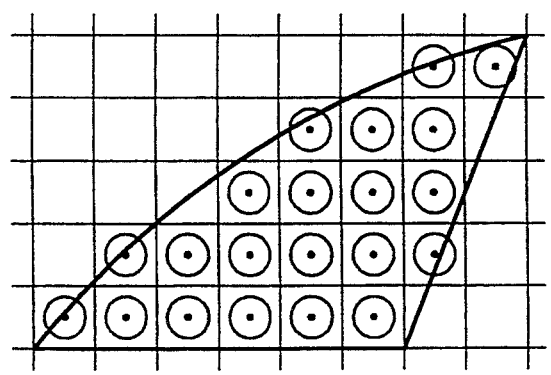

Before beginning a discussion of the algorithm of the present invention, it should be noted that Pitteway's algorithm, published in 1967, used what can be called the "midpoint" algorithm to select a thin but connected set of pixels to represent an infinitely thin conic arc. This is shown in FIG. 5a. Pitteway's algorithm is adapted as will be seen, to filling regions bounded by curves. The selection of pixels to represent the interior of the filled region is performed according to what can be called the "fill" rule; namely, that a pixel is considered to be a part of the interior if its center lies within the region bounded by the conic arc. This is shown in FIG. 5b.

As shown in FIG. 1, the x-y raster coordinate system 10 consists of integer coordinate grid lines (0-3) and (0-4) between pixels.

Thus, the zero y coordinate grid line and the zero x coordinate grid line, respectively, extend away normal to one another in the x and y directions and define the pixels at their respective intecies intersections. Accordingly, pixel 0,0 is in the lower left corner, x position 0, y position 0, and pixel 2,3 is in the upper right corner, x position 2, y position 3. Of course, other definitions of the pixel locations can be used with suitable adjustments to the described algorithms. The rest of the pixels, not identified separately by numeral but represented by circles, lie between the remaining integer grid lines. Also, the twelve pixels represented in FIG. 1 serve to describe the definition system used for any number of pixels desired.

FIG. 2 depicts the described x-y raster coordinate system 10 overlaid with small arrows, such as arrow 201, representing the path taken by the curve tracker algorithm of the invention in filling a circle 202 of radius r. By convention, the algorithm tracks the curve of circle 202 in a counter clockwise direction, keeping the interior on the left. Each arrow, such as arrow 201, represents a "step" (or iteration) of the algorithm. Pixels lying close to the curve are indicated; small, filled circles, such as circles 44 and 46, are pixels lying inside the circle, and small, unfilled circles, such as circles 48 and 50, are pixels lying outside circle 202.

The curve is partitioned into drawing octants 1 through 8. In drawing octant 1, the curve's slope m is between 0 and +1; in octant 2, the slope is between +1 and +infinity; and so on around circle 202. Within each octant each successive step is restricted to one of two neighboring grid (integer x-y coordinates) points, the grid points being represented by the crossed lines. In octant 1, for example, the next step is either (1) to the diagonally adjacent neighbor up and to the right, or (2) to the horizontally-adjacent neighbor to the right.

FIGS. 3A through 3H depict the two possible step directions, represented by pairs of arrows, such as 54 and 56, extending from the current point, such as point 58, for each octant.

As in Pitteway's algorithm, a decision variable d is used within each octant to determine which of the two directions to step. Let $(x_i, y_i)$ represent the algorithm's current position, where $x_i$ and $y_i$ are integer coordinates. Also let $f(x,y)=0$ represent the equation for the conic curve (or circle, in the example of FIG. 2). At a point (x,y) that lies inside the circle, $f(x,y)<0$; in other words, we can determine whether a point is inside, outside, or on the curve merely by determining the sign of function f evaluated at the point. The decision variable d is calculated by evaluating f(x,y) at a point $(x_1 \pm \frac{1}{2}, y_1 \pm \frac{1}{2})$, which is at one of the four pixel centers closest to the current position:

1. In octants 1 and 2, $d_i = f(x_i + \frac{1}{2}, y_i + \frac{1}{2})$;
2. In octants 3 and 4, $d_i = f(x_i - \frac{1}{2}, y_i + \frac{1}{2})$;
3. In octants 5 and 6, $d_i = f(x_i - \frac{1}{2}, y_i - \frac{1}{2})$; and
4. In octants 7 and 8, $d_i = f(x_i + \frac{1}{2}, y_i - \frac{1}{2})$.

Simplified versions of the algorithm for octants 1 through 8 for circle 202 of FIG. 2 follow.

```
In octant 1:
    d=f(x+1/2,y+1/2);
    if(d < 0)
        ++x;
    else{
        mark_edge_at(x+1/2,y+1/2);
        ++x;
        ++y;
    }
In octant 2:
    d=f(x+1/2,y+1/2);
    if(d < 0)}
        mark_edge_at(x+3/2,y+1/2);
        ++x;
        ++y;
    {else}
        mark_edge_at(x+1/2,y+1/2);
        ++y;
    }
In octant 3:
    d=f(x-1/2,y+1/2);
    if(d < 0){
        mark_edge_at(x+1/2,y+1/2);
        ++y;
    {else}
        mark_edge_at(x-1/2,y+1/2);
        --x;
        ++y;
    {
In octant 4:
    d=f(x-1/2,y+1/2);
    if(d < 0){
        mark_edge_at (x+1/2,y+1/2);
        --x;
        ++y;
    }else
        --x;
In octant 5:
    d=f(x-1/2,y-1/2);
    if(d < 0)
        --x;
    esle{
        mark_edge_at(x+1/2,y-1/2);
        --x;
        --y;
    }
In octant 6:
    d=f(x-1/2,y-1/2);
    if(d < 0){
        mark_edge_at(x-1/2,y-1/2);
        --x;
        --y;
    }else{
        mark_edge_at(x+1/2,y-1/2);
        --y;
    }
In octant 7:
    d=f(x+1/2,y-1/2);
    if(d < 0){
        mark_edge_at(x+1/2,y-1/2);
        --y;
    }else{
        mark_edge_at(x+3/2,y-1/2);
        ++x;
        --y;
    }
In octant 8:
    d=f(x+1/2,y-1/2);
    if(d < 0){
        mark_edge_at (x+1/2,y-1/2);
        ++x;
        --y;
    }else
        ++x;
```

Decision variable d is negative if evaluated at a pixel (small filled circle in FIG. 2) that lies inside the circle; d is positive if evaluated at pixel (small unfilled circle in FIG. 2) that lies outside the circle.

The "mark_edge_at" function designates the pixel centered at the designated x and y coordinates as the leftmost pixel in a horizontal span. The pixels shown in FIG. 2 as small filled circles are marked along the left side of the circle; the pixels shown in FIG. 2 as small unfilled circles are marked along the right side.

Octant Tests

The determination of the octant is based on the values of partial derivatives df/dx and df/dy evaluated at or near the current position (defined by integer coordinates $x_i$, $y_i$). The tests in octants 1–8 are summarized below (refer to FIG. 4):

TABLE 1

In octant 1 while df/dx < −df/dy
In octant 2 while df/dy < 0
In octant 3 while df/dx > df/dy
In octant 4 while df/dx > 0
In octant 5 while −df/dx < df/dy
In octant 6 while df/dy > 0
In octant 7 while −df/dx > −df/dy
In octant 8 while df/dx < 0
where $f(x,y) = Ax^2 + Bxy + Cy^2 + Dx + Ey + F$

Incremental Calculations

A practical implementation of the algorithm, modified to simplify the calculations and improve execution speed, calculates decision variable d incrementally based on its value at the previous iteration, similar to Pitteway's algorithm. Also, the number of loops can be reduced from 8 to 4 by exploiting symmetry between the loops for octants n and n+4 (for n=1, 2, 3 and 4).

The difference values necessary to incrementally update decision variable d in each of the 8 octants are derived below. Variables U and V below are the values by which d is incremented during square (horizontal or vertical) and diagonal steps, respectively. Variables U and V are in turn updated by increments $k_1$, $k_2$ and $k_3$, which remain constant within the inner loop.

OCTANT 1: Update Decision Variable d $d_i = f(x_i + 1/2, y_i + 1/2)$

-continued $= A(x_i+1/2)^2 + B(x_i+1/2)$
$(y_i+1/2) + C(y_i+1/2)^2 + D(x_i+1/2) + E(y_i+1/2) + F$
Square Move: $x_{i+1} = x_i+1, y_{i+1} = y_i$
$U_{i+i} = d_{i+1} - d_i = f((x_i+1/2)+1, y_i+1/2) - f(x_i+1/2, y_i+1/2)$
$= A[2(x_i+1/2)+1] + B[(y_i+1/2)] + D$
$= 2Ax_{i+1} + By_{i+1} + B/2 + D$
$= U_i + 2A = U_i + K_1$ where $K_1 = 2A$ in octant 1
$V_{i+1} = V_i + 2A + B = V_i + K_2$ where $K_2 = 2A+B$
Diagonal Move: $x_{i+i} = x_i+1, y_{i+1} = y_i+1$
$U_{i+1} = U_i + 2A + B = U_i + K_2$ $K_2 = 2A+B$ in octant 1.
$V_{i+1} = d_{i+1} - d_i = f((x_i+1/2)+1, (y_i+1/2)+1) - f(x_i+1/2, y_i+1/2)$
$= A[2(x_i+1/2)+1] + B[(x_i+1/2)+(y_i+1/2)+1] + C[2(y_i+1/2)+1] + D + E$
$= (2A+B)x_{i+1} + (B+2C)y_{i+1} + D + E$
$= V_i + 2(A+B+C) = V_i + K_3$ where $K_3 = 2(A+B+C)$ in octant 1
Initialization: $x_0 = 0, y_0 = 0$
$d_0 = (A+B+C)/4 + (D+E)/2 + F$
$u_0 = B/2 + D$
$v_0 = D + E$
$k_1 = 2A$
$k_2 = 2A + B$
$k_3 = 2(A+B+C)$

OCTANT 2: Update Decision Variable d $d_i = f(x_i+1/2, y_i+1/2)$
$= A(x_i+1/2)^2 + B(x_i+1/2)$
$(y_i+1/2) + C(y_i+1/2)^2 + D(x_i+1/2) + E(y_i+1/2) + F$
Square Move: $x_{i+1} = x_i, y_{i+1} = y_i+1$
$U_{i+1} = d_{i+1} = f(x_i+1/2, (y_i+1/2)+1) - f(x_i+1/2, y_i+1/2)$
$= B[(x_i+1/2)] + C[2(y_i+1/2)+1] + E$
$= Bx_{i+1} + 2Cy_{i+1} + B/2 + E$
$= U_i + 2C = U_i + K_1$ where $K_1 = 2C$ in octant 2
$V_{i+1} V_i + B + 2C = V_i + K_2$ where $K_2 = B+2C$
Diagonal Move: $x_{i+1} = x_i+1, y_{i+1} = y_i+1$
$U_{i+1} = U_i + B + 2C = U_i + K_2$ where $K_2 = B+2C$ in octant 2
$V_{i+1} = d_{i+1} - d_i = f((x_i+1/2)+1, (y_i+1/2)+1) - f(x_i+1/2, y_i+1/2)$
$= A[2(x_i+1/2)+1] + B[(x_i+1/2)+(y_i+1/2)+1] + C[2(y_i+1/2)+1] + D + E$
$= (2A+B)x_{i+1} + (B+2C)y_{i+1} + D + E$
$= V_i + 2(A+B+C) = V_i + K_3$ where $K_3 = 2(A+B+C)$ in octant 2
Initialization: $x_0 = 0, y_0 = 0$
$d_0 = (A+B+C)/4 + (D+E)/2 + F$
$u_0 = B/2 + E$
$v_0 = D + E$
$K_1 = 2C$
$K_2 = B + 2C$
$K_3 = 2(A+B+C)$

OCTANT 3: Update Decision Variable d $d_i = f(xhd\ i-1/2, y_i+1/2)$
$= A(x_i-1/2)^2 + B(x_i-1/2)$
$(y_i+1/2) + C(y_i+1/2)^2 + D(x_i-1/2) + E(y_i+1/2) + F$
Square Move: $x_{i+1} = x_i, y_{i+1} = y_i+1$
$U_{i+1} = d_{i+1} - d_i = f(x_i-1/2, (y_i+1/2)+1) - f(x_i-1/2, y_i+1/2)$
$= B[(x_i-1/2)] + C[2(y_i+1/2)+1] + E$
$= Bx_{i+1} + 2Cy_{i+1} - B/2 + E$
$= U_i + 2C = U_i + K_1$ where $K_1 = 2C$ in octant 3
$V_{i+1} = V_i - B + 2C = V_i K_2$ where $K_2 = -B+B+2C$
Diagonal Move: $x_{i+1} = x_i-1, y_{i+1} = y_i+1$
$U_{i+1} = U_i - B + 2C = U_i + K_2$ in octant 3
$V_{i+1} = d_{i+1} - d_i = f((x_i-1/2)-1, (y_i+1/2)+1) - f(x_i-1/2, y_i+1/2)$
$= A[-2(x_i-1/2)+1] + B[(x_i-1/2)-(y_i+1/2)-1] + C[2(y_i+1/2)+1] - D + E$
$= (-2A+B)x_{i+1} + (-B+2C)y_{i+1} - D + E$
$= V_i + 2A - 2B + 2C = V_i + K_3$ where $K_3 = 2(A-B+C)$ in octant 3
Initialization: $x_0 = 0, y_0 0$
$d_0 = (A-B+C)/4 + (-D+E)/2 + F$   $K_1 = 2C$
$U_0 = -B/2 + E$   $K_2 = -B + 2C$
$V_0 = -D + E$   $K_3 = 2(A-B+C)$

OCTANT 4: Update Decision Variable d $d_i = f(x_i-1/2, y_i+1/2)$
$= A(x_i-1/2)^2 + B(x_i-1/2)(y_i+1/2) + C(y_i+1/2)^2 + D(x_i-1/2) + E(y_i+1/2) + F$
Square Move: $x_{i+1} = x_i-1, y_{i+1} = y_i$
$U_{i+1} = d_{i+1} - d_i = f(x_i-1/2)-1, y_i+1/2) - f(x_i-1/2, y_i+1/2)$
$= A[-2(x_i-1/2)+1] + B[(y_i+1/2)] - D$
$= -2Ax_{i+1} - By_{i+1}, -B/2 - D$
$= -2Ac_{i+1} - By_{i+1} - B/2 - D$
$= U_i + 2A = U_i + K_1$ where $K_1 = 2A$ in octant 4
$V_{i+1} = V_i + 2A - B = V_i + K_2$ where $K_2 = 2A-B$
Diagonal Move: $x_{i+1} = x_i-1, y_{i+1} = y_i+1$
$U_{i+1} = U_i + 2A = U_i + K_2$ where $K_2 = 2A-B$ in octant 4
$V_{i+1} = d_{i+1} - d_i = f((x_i-1/2)-1, (y_i+1/2)+1) - f(x_i-1/2, y_i+1/2)$ $= A[-2(x_i-1/2)+1] + B[(x_i-1/2)-(y_i+1/2)-1] + C[2y_i+1/2)+1] - D + E$
$= (-2A+B)x_{i+1} + (-B+2C)y_{i+1} - D + E$
$= V_i + 2A - 2B + 2C = V_i + K_3$ where $K_3 = 2(A-B+C)$ in octant 4
Initialization: $x_0 = 0, y_0 = 0$
$d_0 = (A-B+C)/4 + (-D+E)/2 + F$   $K_1 = 2A$
$U_0 = -B/2 - D$   $K_2 = 2A - B$
$V_0 = -D + E$   $K_3 = 2(A-B+C)$

OCTANT 5: Update Decision Variable d $d_i = f(x_i-1/2, y_i-1/2)$
$= A(x_i-1/2)^2 + B(x_i-1/2)(y_i-1/2) + C(y_i-1/2)^2 + D(x_i-1/2) + E(y_i-1/2) + F$
Square Move: $x_{i+1} = x_i-1, y_{i+1} = y_i$
$U_{i+1} = d_{i+1} - d_i = f((x_i-1/2)-1, y_i-1/2) - f(x_i-1/2, y_i-1/2)$
$= A[-2(x_i-1/2)+1] + B[-(y_i-1/2)] - D$
$= -2Ax_{i+1} - By_{i+1} + B/2 - D$
$= U_i + 2A = U_i + K_1$ where $K_1 = 2A$ in octant 5
$V_{i+1} = V_i + 2A + B = V_i + K_2$ where $K_2 = 2A+B$
Diagonal Move: $x_{i+1} = x_i-1, y_{i+1} = y_i-1$
$U_{i+1} = U_i + 2A + B = U_i + K_2$ where $K_2 = 2A+B$ in octant 5
$V_{i+1} = d_{i+1} - d_i = f((x_i-1/2)-1, (y_i-1/2)-1) - f(x_i-1/2, y_i-1/2)$
$= A[-2(x_i-1/2)+1] + B[-(x_i-1/2)-(y_i+1/2)+1] + C[-2(y_i-1/2)+1] - D - E$
$= (-2A-B)x_{i+1} + (-B-2C)y_{i+1} - D - E$
$= V_i + 2(A+B+C) = V_i + K_3$ where $K_3 = 2(A+B+C)$ in octant 5
Initialization: $x_0 = 0, y_0 = 0$
$d_0 = (A+B+C)/4 + (-D-E)/2 + F$
$U_0 = B/2 - D$
$V_0 = -D - E$
$K_1 = 2A$
$K_2 = 2A + B$
$K_3 = 2(A+B+C)$

OCTANT 6: Update Decision Variable d $d_i = f(x_i-1/2, y_i-1/2) = A(x_i-1/2)^2 + B(x_i-1/2)(y_i-1/2) + C(y_i-1/2)^2 + D(x_i-1/2) + E(y_i-1/2)$
Square Move: $x_{i+1} = x_i, y_{i+1} = -1$
$U_{i+1} = d_{i+1} - d_i = f((x_i-1/2, (y_i-1/2)-1) - f(x_i-1/2, y_i-1/2)$
$= B[-(x_i-1/2)] + C[-2(y_i-1/2)+1] - E$
$= -Bx_{i+1} - 2Cy_{i+1} + B/2 - E$
$= U_i + 2C = U_i + K_1$ where $K_1 = 2C$ in octant 6
$V_{i+1} = V_i + B + 2C = V_i + K_2$ where $K_2 = B+2C$
Diagonal Move: $x_{i+1} = x_i-1, y_{i+1} = y_i-1$
$U_{i+1} = U_i + B + 2C = U_i + K_2$ where $K_2 = B+2C$ in octant 6
$V_{i+1} = d_{i+1} - d_i = f((x_i-1/2)-1, (y_i-1/2)-1) - f(x-1/2, y-1/2)$
$= A[-2(x_i-1/2)+1] + B[-(x_i-1/2)-(y_i-1/2)+1] + C[-2(y_i-1/2)+1] - D - E$
$= (-2A-B)x_{i+1} + (-B-2C)y_{i+1} - D - E$
$= V_i + 2(A+B+C) = V_i + K_3$ where $K_3 = 2(A+B+C)$ in octant 6
Initialization: $x_0 = 0, y_0 = 0$
$d_0 = (A+B+C)/4 + (-D-E)/2 + F$
$U_0 = B/2 - E$
$V_0 = -D - E$
$K_1 = 2C$
$K_2 = B + 2C$
$K_3 = 2(A+B+C)$

OCTANT 7: Update Decision Variable d $d_i = f(x_i+1/2, y_i-1/2)$
$= A(x_i+1/2)^2 + B(x_i+1/2)$
$(y_i-1/2) + C(y_i-1/2)^2 + D(x_i+1/2) + E(y_i-1/2) + F$
Square Move: $x_{i+1} = x_i, y_{i+1} = y_i-1$
$U_{i+1} = d_{i+1} - d_i = f(x_i+1/2, (y_i-1/2)-1) - f(x_i+1/2, y_i-1/2)$
$= B[-(x_i+1/2)] + C[-2(y_i-1/2)+1] - E$
$= -Bx_{i+1} - 2Cy_{i+1} - B/2 - E$
$= U_i + 2C = U_i + K_1$ where $K_1 = 2C$ in octant 7
$V_{i+1} = V_i - B + 2C = V_i + K_2$ where $K_2 = -B+2C$
Diagonal Move: $x_{i+1} = x_i+1, y_{i+1} = y_i-1$
$U_{i+1} = U_i - B + 2C = U_i + K_2$ where $K_2 = -B+2C$ in octant 7
$V_{i+1} = d_{i+1} - d_i = f((x_i+1/2)+1, (y_i-1/2)-1) - f(x_i+1/2, y_i-1/2)$
$= A[2(x_i+1/2)+1] + B[-(x_i+1/2)+(y_i-1/2)-1] + C[-2(y_i-1/2)+1] + D - E$
$= (2A-B)x_{i+1} + (B-2C)y_{i+1} + D - E$
$= V_i + 2(A-B+C) = V_i + K_3$ where $K_3 = 2(A-B+C)$ in octant 7
Initialization: $x_0 = 0, y_0 = 0$
$d_0 = (A-B+C)/4 + (D-E)/2 + F$
$U_0 = -B/2 - E$
$V_0 = D - E$
$K_1 = 2C$
$K_2 = -B + 2C$
$K_3 = 2(A-B+C)$

OCTANT 8: Update Decision Variable d

-continued $d_i = f(x_i+1/2, y_i-1/2)$
$= A(x_i+1/2)^2 + B(x_i+1/2)(y_i-1/2) + C(y_i-1/2)^2 + D(x_i+1/2) + E(y_i-1/2) + F$
Square Move: $x_{i+1} = x_i, y_{i+1} = y_i$
$U_{i+1} = d_{i+1} - d_i = f((x_i+1/2)+1, y_i-1/2)-1) - f(x_i+1/2, y_i-1/2)$
$= A[2(x_i+1/2)+1] + B[(y_i-1/2)] + D$
$= 2Ax_{i+1} + By_{i+1} - B/2 + D$
$= U_i + 2A = U_i + K_1$ where $K_1 = 2A$ in octant 8
$V_{i+1} = V_i + 2A - B = V_i + K_2$ where $K_2 = 2A - B$
Diagonal move: $x_{i+1} = x_i+1, y_{i+1} = y_i-1$
$U_{i+1} = U_i + 2A - B = U_i + K_2$ where $K_2 = 2A - B$ in octant 8
$V_{i+1} = d_{i+1} - d_i = f((x_i+1/2)+1, (y_i-1/2)-1) - f(x_i+1/2, y_i-1/2)$
$= A[2(x_i+1/2)+1] + B[(-x_i+1/2) + (y_i-1/2) - 1] + C[-2(y_i-1/2)+1] + D - E$
$= (2A-B)x_{i+1} + (B-2C)y_{i+1} + D - E$
$= V_i + 2(A-B+C) = V_i + K_3$ where $K_3 = 2(A-B+C)$ in octant 8
Initialization: $x_0 = 0, y_0 = 0$
$d_0 = (A-B+C)/4 + (D-E)/2 + F$
$U_0 = -B/2 + D$
$V_0 = D - E$
$K_1 = 2A$
$K_2 = 2A - B$
$K_3 = 2(A-B+C)$

Detect Octant Change

In FIG. 4, ellipse 60 represents the general form of a conic section. As in FIG. 2, the perimeter of ellipse 60 is partitioned into octants numbered 1-8 by boundary arrows, such as boundary arrow 62. Again like in FIG. 2, the curve-tracking algorithm moves in a counter-clockwise direction around the perimeter of ellipse 60. The transition from one octant to the next is detected by examining the components of the gradient vector. After entering an octant, the algorithm's current position remains in that octant as long as the appropriate condition remains true to the conditions depicted in Table 1.

The gradient vector is defined to be:

$$\text{grad} f = df/dx \cdot \hat{i} + df/dy \cdot \hat{j}$$

where $f(x,y) = Ax^2 + Bxy + Cy^2 + Dx + Ey + F = 0$
and $\hat{i}$ and $\hat{j}$ are unit vectors in the x and y directions.

Octant Test

While a condition remains true, the current position of the algorithm on the perimeter of the ellipse is within the designated octant.

$f(x,y) = Ax^2 + Bxy + Cy^2 + Dx + Ey + F$ $df/dx = 2Ax + By + D, \quad df/dy = Bx + 2Cy + E$

Octant 1

$df/dx < -df/dy, \quad df/dx + df/dy < 0 \quad df/dx + df/dy = (-2A+B)x_i + (B+2C)y_i + D + E = V_i$ The condition is $V_i < 0$.

Octant 2

$df/dy < 0, df/dy = Bx + 2Cy + E$
$df/dy = U_i + (K_1 - K_2)/2$. The condition is $U_i < (K_2 - K_1)/2$.

Octant 3

$df/dx > df/dy, df/dx - df/dy > 0 \quad df/dx - df/dy = (-2A-B)x_i + (B-2C)y_i + D - E = -V_i$. The condition is $V_i < 0$.

Octant 4

$df/dx > 0, \quad df/dx = 2Ax_i + By_i + D$
$df/dx = -U_i + (K_2 - K_1)/2$. The condition is $U_i < (K_2 - K_1)/2$.

Octant 5

$-df/dx < dy/dx, df/dx + dy/dx > 0 \quad df/dx + df/dy = (-2A+B)x_i + (B+2C)y_i + D + E = -V_i$. The condition is $V_i < 0$.

Octant 6

$df/dy > 0, df/dy = Bx_i + Cy_i + E = -U_i + (K_2 - K_1)/2$.
The condition is $U_i < (K_2 - K_1)/2$.

Octant 7

$-df/dx > -df/dy, df/dx - df/dy < 0$
$df/dx - df/dy = (2A-B)x_i + (B-2C)y_i + D - E = V_i$.
The condition is $V_i < 0$.

Octant 8

$df/dx < 0, df/dx = 2Ax_i + By_i + D$
$df/dx = U_i + (K_1 - K_2)/2$. The condition is $U_i < (K_2 - K_1)/2$.

Update Loop Parameters During Octant Change

When crossing the boundary from one octant to the next, parameters d, u, v, $k_1$, $k_2$ and $k_3$ must be modified to be valid in the new octant. The new values can be calculated in terms of the values in the previous octant.

| Case 1: Change from ODD to EVEN octant. | | | |
|---|---|---|---|
| d' | = d | $k_1'$ | = $k_1 - 2k_2 + k_3$ |
| v' | = v | $k_2'$ | = $k_3 - k_2$ |
| u' | = $v - u - k_1 + k_2$ | $k_3'$ | = $k_3$ |
| new | old | new | old |
| Case 2: Change from EVEN to ODD octant. | | | |
| d' | = $d + u - v + k_1 - k_2$ | $k_1'$ | = $k_1$ |
| v' | = $2u - v + k_1 - k_2$ | $k_2'$ | = $2k_1 - k_2$ |
| u' | = $u + k_1 - k_2$ | $k_3'$ | = $k_3 + 4k_1 - 4k_2$ |
| new | old | new | old |

In either case above, the primed quantities represent the values in the new octant, while the unprimed quantities are the values in the old octant.

The detailed derivations of the parameter changes occurring at each of the 8 octant boundaries are given below:

Octant 1–Octant 2: $d' = d, v' = v$
$u' = v - u - k_1 + k_2$
$= [(2A+B)x + (B+2C)y + D + E] - [2Ax + By + B/2 + D] + B$
$= Bx + 2Cy + B/2 + E$
2-3: $d' - d = u - v + k_1 - k_2$
$= [Bx + Cy + B/2 + E] - [(2A+B)x + (B+2C)y + D + E] - B$
$= -2Ax - By - B/2 - D$
$= f((x+1/2)-1, y+1/2) - f(x+1/2, y+1/2)$
$= A[-2(x+1/2)+1] + B[-(y+1/2)] - D$
$= -2Ax - By - B/2 - D$
$v' = 2u - v + k_1 - k_2$
$= [Bx + 2Cy + B/2 + E] + [-2Ax - By - B/2 - D]$
$= (-2A+B)x + (-B+2C)y - D + E$
$u' = u + k_1 - k_2 = [Bx + 2Cy + B/2 + E] - B = Bx + 2Cy - B/2 + E$
3-4: $d' = d, v' = v$
$u' = v - u - k_1 + k_2$
$= [(-2A+B)x + (-B+2C)y - D + E] - ]Bx + 2Cy - B/2 + E] - B$
$= -2Ax - By - B/2 - D$
4-5: $d' - d = f(x - 1/2, (y+1/2)-1) - f(x-1/2, y+1/2)$
$= B[-(x-1/2)] + C[-2(y+1/2)+1] - E$ -continued $$= -Bx - 2Cy + B/2 - E$$
$$= u - v + k_1 - k_2 = [-2Ax - By - B/2 - D] -$$
$$[(-2A+B)x + (-B+2C)y - D + E] + B$$
$$= -Bx - 2Cy + B/2 - E$$
$$v' = 2u - v + k_1 - k_2 = [-2Ax - By - B/2 - D] +$$
$$[-Bx - Cy + B/2 - E]$$
$$= (-2A - B)x + (-B - 2C)y - D - E$$
$$u' = u + k_1 - k_2 = u + B$$

5–6: $d' = d, v' = v$
$$u' = v - u - k_1 + k_2$$
$$= [(-2A-B)x + (-B-2C)y - D - E] -$$
$$[-2Ax - By + B/2 - D] + B$$
$$= -Bx - 2Cy + B/2 - E$$

6–7: $d' - d = f((x - 1/2) + 1, y - 1/2) - f(x - 1/2, y - 1/2)$
$$= A[2(x-1/2) + 1] + B[(y-1/2)] + D$$
$$= 2Ax + By - B/2 + D$$
$$= u - v + k_1 - k_2$$
$$= [-Bx_i - 2Cy_i + B/2 - E] - [(-2A-B)x +$$
$$(-B - 2C)y - D - E] - B$$
$$= 2Ax + By - B/2 + D$$
$$v = 2u - v + k_1 - k_2 = u + [u - v + k_1 - k_2]$$
$$= [-Bx - 2Cy + B/2 - E] + [2Ax + By - B/2 + D]$$
$$= (-B + 2A)x + (B - 2C)y + D - E$$
$$u' = u + k_1 - k_2 = U - B$$

7–8: $d' = d, v' = v$
$$u' = v - u - k_1 + k_2$$
$$= [(2A - B)x + (B - 2C)y + D - E] - [-Bx - 2Cy - B/2 - E] - B$$
$$= 2Ax + By - B/2 + D$$

8–1:
$$d' - d = f(x + 1/2, (y - 1/2) + 1) - f(x + 1/2, y - 1/2)$$
$$= B[(x_i + 1/2)] + C[2(y_i - 1/2) + 1] + E$$
$$= Bx + 2Cy + B/2 + E$$
$$= u - v + k_1 - k_2$$
$$= [2Ax + By - B/2 + D] - [(2A - B)x + (B - 2C)y + D - E] + B$$
$$= Bx + 2Cy + B/2 + E$$
$$v' = 2u - v + k_1 - k_2$$
$$= [2Ax + By - B/2 + D] + [Bx + 2Cy + B/2 + E]$$
$$= (2A + B)x + (B + 2C)y + D + E$$
$$u' = u + k_1 - k_2$$
$$= u + B$$

Implementation

The implementation of the invention can be purely in software, in which case the invention will run on existing computer equipment. Hardware enhancements, on the other hand, can accelerate the speed at which the invention operates.

Figure 6:
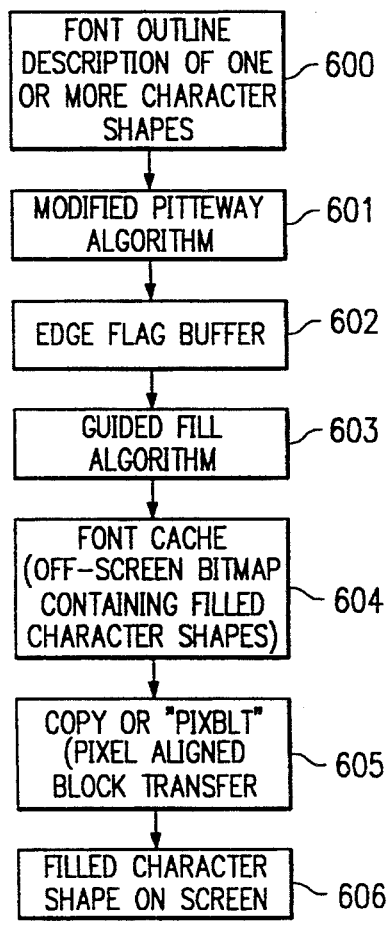
FIGS. 6 and 7 show alternative embodiments of the invention.

FIG. 6 is a system-level block diagram of a software implementation of the invention. For some applications, a software implementation may not be fast enough to construct character shapes on a screen (or other display surface) directly from the font-outline specifications. In applications requiring real-time text speeds, an intermediate step may be necessary. The invention can be used to construct a bitmapped representation of some or all of a font's character shapes in a "font cache" contained in a buffer in off-screen memory. Once converted to bitmapped form, the individual character shapes are copied (via PixBlt, or pixel-aligned block transfer) to the screen from cache 604 as they are needed. Copying the bitmapped character shapes from font cache 604 can be performed much more rapidly than constructing the character shapes from the font-outline specification. This method, however, requires that the software maintain the font cache, and also requires the allocation of memory for the font cache bitmap.

Figure 7:
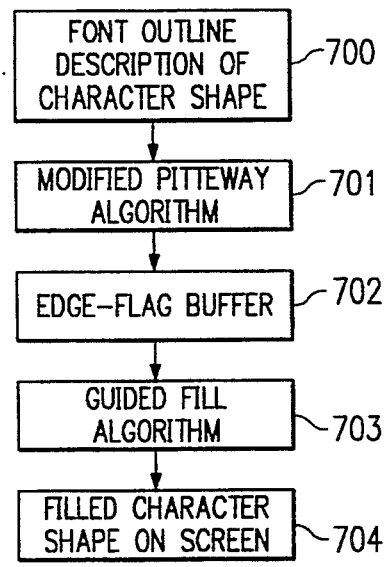

FIG. 7 is a system-level block diagram of an implementation of the invention that includes hardware acceleration of critical operations. An efficient hardware implementation operates at speeds sufficient to eliminate the need to cache font bitmaps. Under these conditions, the invention can be used to construct the character shapes on screen 704 directly from their font-outline descriptions. This eliminates the software and storage overhead necessary to maintain the font cache. As described previously, the invention requires two processing steps to construct a filled character shape from its font-outline description. Both steps can be assisted by acceleration hardware.

The first step is to draw the outline of the character to an edge-flag buffer, which is a one-bit-per-pixel bitmap. Acceleration hardware can be designed to calculate the positions of edge flags along a curved boundary at high speeds using a hardwired implementation of a modified Pitteway algorithm 701. The acceleration hardware may be incorporated into a graphics processor chip such as the TMS34010, for instance. The implementation of a modified Pitteway algorithm is similar to implementations of Bresenham's line-drawing algorithm in existing hardware, except that Pitteway's algorithm draws conics, and is therefore somewhat more complex than Bresenham's. While edge-flag buffer 702 could be contained in main memory, the construction of the character outline could be performed more rapidly in an edge-flag buffer on the same chip as the graphics processor containing the hardware acceleration for the Pitteway algorithm. The speed improvement resulting from having an on-chip edge-flag buffer could be crucial for meeting the speed requirements of real time text applications.

The second step of the process can also be sped up by acceleration hardware. In this step, the character outline contained in the edge-flag buffer is used to guide the construction of a filled character shape on screen 703. The character is filled using a parity-fill algorithm that constructs the filled character shape one scan line at a time. For each scan line, the algorithm begins at the left edge of the portion of the edge-flag buffer containing the edge bits for the scan line. The algorithm searches from left to right, recording in turn the x coordinate of each edge flag (represented as a 1 in the bitmap). Each pair of adjacent edge flags on the scan line represents the beginning and end of a filled span within the character, and results in the span being filled on the screen. (The span includes the starting pixel but excludes the ending pixel). The acceleration hardware can speed up the process of searching the edge-flag buffer for edge flags.

In fact, a hardwired "guided fill" mechanism 703 can automatically perform the conversion of edge flag to filled spans on the screen with minimal software intervention. Again, the potential speed-up for the guided-fill process will be greater if the storage for the edge-flag buffer is on the same chip as the processor performing the guided fill. This arrangement supports a pipeline mechanism whereby one span in the display memory external to the graphics processor chip is being filled at the same time the pair of edge bits for the next span is being located in the edge-flag buffer internal to the chip.

The preceding discussion has assumed that the edge flags are stored in a one-bit-per-pixel bitmap; i.e., that the outline of a character shape is drawn into this bitmap. An equivalent implementation stores the same information as a linked list rather than a bitmap. In this implementation, the edge flags are bucket-sorted by scan line, and a linked list is maintained per scan line. Each list contains the x coordinates of the edge flags in left-to-right order across the scan line. For very large filled shapes, the edge-flag array may be relatively sparse, in which case the linked-list representation for the buffer may require less storage than a bitmap. In a typical text application, however, most character shapes should be small enough that the bitmap representation for the edge-flag buffer is preferable.

It should be noted that one use of the invention is to present graphics or type fonts to a user. This can be done, for example, on any output display device, such as a CRT display terminal or a printer.

Although this description describes the invention with reference to the above specified embodiments, the claims and not this description limit the scope of the invention. Various modifications of the disclosed embodiment, as well as alternative embodiments of the invention, will become apparent to persons skilled in the art upon reference to the above description. Therefore, the appended claims will cover such modifications that fall within the true scope of the invention.

What is claimed is:

1. A method of defining pixels in an X-Y raster coordinate system within a closed region bounded by piecewise conic curves defined by corresponding conic equations of the form $f(x,y)=0$, said method comprising the steps of:

tracking a boundary of the closed region in a counterclockwise direction by following the piecewise conic curves including determining an octant of the corresponding piecewise conic curve from $df(x_c,y_c)/dx$ and $df(x_c,y_c)/dy$ at a current pixel $(x_c,y_c)$, determining a next pixel as one of a pair of adjacent pixels of a set of eight adjacent pixels corresponding to the determined octant and the value of $f(x,y)$ at an incrementally displaced location corresponding to the determined octant, setting said next pixel as the current pixel and repeating said substeps of determining an octant of the corresponding piecewise conic curve, determining the next pixel, determining if said next pixel is within another piecewise conic curve and setting said next pixel as the current pixel until the tracking of the boundary is complete;

determining edge pixels within said X-Y raster coordinate system at an edge of the closed region from said corresponding conic equation of each piecewise conic curve, said step of determining edge pixels includes forming an edge-flag linked list of respective lines and columns of edge pixels;

on a scan line by scan line, left to right basis determining any pixels between a pair of edge pixels, said determined pixels defining the pixels within the closed region, said step of determining any pixels between a pair of edge pixels includes sorting said edge-flag linked list by scan line from top to bottom, further sorting said scan line sorted edge-flag linked list within each scan line from left to right, and forming a filled pixel map in the X-Y raster coordinate system from said further sorted edge-flag linked list with any pixels between a pair of edge pixels on a scan line having a first state and other pixels having a second state, said pixels in said first state defining the pixels within the closed region.

2. The method as claimed in claim 1, wherein:

said substep of determining an octant of the corresponding piecewise conic curve from $df(x_c,y_c)/dx$ and $df(x_c,y_c)/dy$ at a current pixel $(x_c,y_c)$ includes determining a first octant if $df(x_c,y_c)/dx < -df(x_c,y_c)/dy$, determining a second octant if $df(x_c,y_c)/dy < 0$, determining a third octant if $df(x_c,y_c)/dx > df(x_c,y_c)/dy$, determining a fourth octant if $df(x_c,y_c)/dx > 0$, determining a fifth octant if $-df(x_c,y_c)/dx < df(x_c,y_c)/dy$, determining a sixth octant if $df(x_c,y_c)/dy > 0$, determining a seventh octant if $-df(x_c,y_c)/dx > -df(x_c,y_c)/dy$, and determining an eighth octant if $df(x_c,y_c)/dx < 0$.

said substep of determining the next pixel includes determining the next pixel as a pixel to the right of the current pixel if $f(x_c+\frac{1}{2},y_c+\frac{1}{2})<0$, otherwise determining the next pixel as a pixel to the right and above the current pixel if said first octant is determined for said piecewise conic curve, determining the next pixel as a pixel to the right and above the current pixel if $f(x_c+\frac{1}{2},y_c+\frac{1}{2})<0$, otherwise determining the next pixel as a pixel above the current pixel if said second octant is determined for said piecewise conic curve, determining the next pixel as a pixel above the current pixel if $f(x_c-\frac{1}{2},y_c+\frac{1}{2})<0$, otherwise determining the next pixel as a pixel to the left and above the current pixel if said third octant is determined for said piecewise conic curve, determining the next pixel as a pixel to the left and above the current pixel if $f(x_c-\frac{1}{2},y_c+\kappa)<0$, otherwise determining the next pixel as a pixel to the left of the current pixel if said fourth octant is determined for said piecewise conic curve, determining the next pixel as a pixel to the left of the current pixel if $f(x_c-\frac{1}{2},y_c-\frac{1}{2})<0$, otherwise determining the next pixel as a pixel to the left and below the current pixel if said fifth octant is determined for said piecewise conic curve, determining the next pixel as a pixel to the left and below the current pixel if $f(x_c-\frac{1}{2},y_c-\frac{1}{2})<0$, otherwise determining the next pixel as a pixel below the current pixel if said sixth octant is determined for said piecewise conic curve, determining the next pixel as a pixel below the current pixel if $f(x_c+\frac{1}{2},y_c-\frac{1}{2})<0$, otherwise determining the next pixel as a pixel to the right and below the current pixel if said seventh octant is determined for said piecewise conic curve, determining the next pixel as a pixel to the right and below the current pixel if $f(x_c+\frac{1}{2},y_c-\frac{1}{2})<0$, otherwise determining the next pixel as a pixel to the right of the current pixel if said eighth octant is determined for said piecewise conic curve.

3. The method as claimed in claim 2, wherein: said step of determining edge pixels includes determining the current pixel as an edge pixel if $f(x_c+\frac{1}{2},y_c+\frac{1}{2})\geq 0$ and said first octant is determined for said piecewise conic curve, determining an edge pixel to the right and above the current pixel if $f(x_c+\frac{1}{2},y_c+\frac{1}{2})<0$ and said second octant is determined for said piecewise conic curve, determining the current pixel as an edge pixel if $f(x_c+\frac{1}{2},y_c+\frac{1}{2})\geq 0$ and said second octant is determined for said piecewise conic curve, determining the current pixel as an edge pixel if $f(x_c-\frac{1}{2},y_c+\frac{1}{2})<0$ and said third octant is determined for said piecewise conic curve, determining an edge pixel to the left of the current pixel if $f(x_c-\frac{1}{2},y_c+\frac{1}{2})\geq 0$ and said third octant is determined for said piecewise conic curve, determining the current pixel as an edge pixel if $f(x_c-\frac{1}{2},y_c+\frac{1}{2})<0$ and said fourth octant is determined for said piecewise conic curve, determining an edge pixel as a pixel below the current pixel if $f(x_c-\frac{1}{2},y_c\frac{1}{2})\geq 0$ and said fifth octant is determined for said piecewise conic curve, determining an edge pixel as a pixel to the left and below the current pixel if $f(x_c-\frac{1}{2},y_c-\frac{1}{2})<0$ and said sixth octant is determined for said piecewise conic curve, determining an edge pixel as a pixel below the current pixel if $f(x_c-\frac{1}{2},y_c-\frac{1}{2})\geq 0$ and said sixth octant is determined for said piecewise conic curve, determining an edge pixel as a pixel below the current pixel if $f(x_c+\frac{1}{2},y_c-\frac{1}{2})<0$ and said seventh octant is determined for said piecewise conic curve, determining an edge pixel as a pixel to the right and below the current pixel if $f(x_c+\frac{1}{2},y_c-\frac{1}{2})\geq 0$ and said seventh octant is determined for said piecewise conic curve, and determining an edge pixel as a pixel to the right and below the current pixel if $f(x_c+\frac{1}{2},y_c-\frac{1}{2})<0$ and said eighth octant is determined for said piecewise conic curve.

4. A method of forming type fonts for a plurality of characters in an X-Y raster coordinate system, said method comprising the steps of:

forming a closed region bounded by piecewise conic curves defined by corresponding conic equations of the form $f(x,y)$ 0 for each character of the type font;

for each character of the type font tracking a boundary of the closed region in a counter-clockwise direction by following the piecewise conic curves including determining an octant of the corresponding piecewise conic curve from $df(x_c,y_c)/dx$ and $df(x_c,y_c)/dy$ at a current pixel $(x_c,y_c)$, determining a next pixel as one of a pair of adjacent pixels of a set of eight adjacent pixels corresponding to the determined octant and the value of $f(x,y)$ at an incrementally displaced location corresponding to the determined octant, setting said next pixel as the current pixel and repeating said substeps of determining an octant of the corresponding piecewise conic curve, determining the next pixel, determining if said next pixel is within another piecewise conic curve and setting said next pixel as the current pixel until the tracking of boundary is complete, determining edge pixels within said X-Y raster coordinate system at an edge of the closed region from said corresponding conic equation of each piecewise conic curve, said step of determining edge pixels includes forming an edge-flag linked list of respective lines and columns of edge pixels; and said step of forming a filled pixel map includes sorting said edge-flag linked list by scan line from top to bottom, further sorting said scan line sorted edge-flag linked list within each scan line from left to right, and forming a filled pixel map in the X-Y raster coordinate system from said further sorted edge-flag linked list with any pixels between a pair of edge pixels on a scan line having a first state and other pixels having a second state, said pixels in said first state defining the pixels within the closed region;

on a scan line by scan line, left to right basis determining any pixels between a pair of edge pixels, forming a filled pixel map of said pixels determined to be between a pair of edge pixels.

5. The method as claimed in claim 4, further comprising the step of:

forming a visual display corresponding to said filled pixel map.

6. The method as claimed in claim 5, wherein:

said step of forming a visual display corresponding to said filled pixel map includes storing said filled pixel map of each character of the type font in a font cache, copying said filled pixel map of selected characters of the type font from the font cache into a display pixel map, and forming a visual display corresponding to said display pixel map.

7. A processor system for generating font characters in an X-Y raster coordinate system from a closed region bounded by a set of piecewise conic curves defined by corresponding conic equations of the form $f(x,y)=0$ for each character of the type font, said processor system comprising:

accepting circuitry for accepting a set of piecewise conic curves defined by corresponding conic equations of the form $f(x,y)=0$ for a character to be generated;

tracking circuitry connected to said accepting circuitry for tracking a boundary of the closed region of said character to be generated in a counter-clockwise direction by following the piecewise conic curves, said tracking circuitry including circuitry for determining an octant fDf the corresponding piecewise conic curve from $df(x_c,y_c)/dx$ and $df(x_c,y_c)/dy$ at a current pixel $(x_c,y_c)$, circuitry for determining a next pixel as one of a pair of adjacent pixels of a set of eight adjacent pixels corresponding to the determined octant and the value of $f(x,y)$ at an incrementally displaced location corresponding to the determined octant, circuitry for setting said next pixel as the current pixel and repeating said substeps of determining an octant of the corresponding piecewise conic curve, determining the next pixel, determining if said next pixel is within another piecewise conic curve and setting said next pixel as the current pixel until the tracking of boundary is complete;

edge development circuitry connected to said tracking circuitry for determining edge pixels within said X-Y raster coordinate system at an edge of the closed region from said corresponding conic equation of each piecewise conic curve;

a edge buffer circuit connected to said edge development circuitry for storing said determined edge pixels, said edge buffer circuit consisting of an edge linked list memory storing an edge-flag linked list of respective lines and columns of edge pixels;

a pixel map memory for storing a map of pixels in the X-Y raster coordinate system; and filling circuitry connected to said buffer circuit and said pixel map memory for filling pixels within said pixel map memory between a pair of edge pixels on a same scan line.

8. The processor system claimed in claim 7, further comprising:

a display connected to said pixel map memory of forming a visual display corresponding to said pixels stored in said pixel map memory.

* * * * *